(12) United States Patent
Pratt et al.

(10) Patent No.: US 8,195,332 B2
(45) Date of Patent: Jun. 5, 2012

(54) LEARNING CAPTURE POINTS FOR HUMANOID PUSH RECOVERY

(75) Inventors: Jerry Pratt, Pensacola, FL (US); Ambarish Goswami, Fremont, CA (US); John Rebula, Ann Arbor, MI (US); Fabian Canas, Boulder, CO (US)

(73) Assignees: Honda Motor Co., Ltd., Tokyo (JP); Florida Institute for Human & Machine Cognition, Inc. (IHMC), Pensacola, FL (US)

( * ) Notice: Subject to any disclaimer, the term of this patent is extended or adjusted under 35 U.S.C. 154(b) by 748 days.

(21) Appl. No.: 12/274,263

(22) Filed: Nov. 19, 2008

(65) Prior Publication Data

US 2009/0132087 A1 May 21, 2009

Related U.S. Application Data

(60) Provisional application No. 60/989,706, filed on Nov. 21, 2007.

(51) Int. Cl.
*B25J 9/10* (2006.01)

(52) U.S. Cl. .................... 700/258; 318/568.12

(58) Field of Classification Search .................. 700/245, 700/258, 246, 251, 253, 260, 261; 318/568.12, 318/568.2, 568.22
See application file for complete search history.

(56) References Cited

U.S. PATENT DOCUMENTS

| | | | |
|---|---|---|---|
| 4,834,200 A | 5/1989 | Kajita | |
| 5,221,883 A | 6/1993 | Takenaka et al. | |
| 7,120,518 B2 | 10/2006 | Takenaka et al. | |
| 7,295,892 B2 * | 11/2007 | Herr et al. | 700/245 |
| 7,496,428 B2 | 2/2009 | Takenaka et al. | |
| 7,657,345 B2 * | 2/2010 | Endo et al. | 700/249 |
| 7,835,822 B2 | 11/2010 | Goswami et al. | |

(Continued)

FOREIGN PATENT DOCUMENTS

WO WO 2005/098733 10/2005

OTHER PUBLICATIONS

Komura, T., et al., "A Feedback Controller for Biped Humanoids that Can Counteract Large Perturbations During Gait," International Conference on Robotics and Automation, 2005, 7 pages.

(Continued)

*Primary Examiner* — Dalena Tran

(74) *Attorney, Agent, or Firm* — Fenwick & West LLP; Mark Duell

(57) ABSTRACT

A system and method is disclosed for controlling a robot having at least two legs, the robot subjected to an event such as a push that requires the robot to take a step to prevent a fall. In one embodiment, a current capture point is determined, where the current capture point indicates a location on a ground surface that is the current best estimate of a stepping location for avoiding a fall and for reaching a stopped state. The robot is controlled to take a step toward the current capture point. After taking the step, if the robot fails to reach a stopped state without taking any additional steps, an updated current capture point is determined based on the state of the robot after taking the step. The current capture points can be stored in a capture point memory and initialized based on a model of the robot.

20 Claims, 5 Drawing Sheets

U.S. PATENT DOCUMENTS

| | | | |
|---|---|---|---|
| 7,865,267 B2 * | 1/2011 | Sabe et al. | 700/245 |
| 2005/0065650 A1 | 3/2005 | Lewis | |
| 2005/0113973 A1 | 5/2005 | Endo et al. | |
| 2007/0220637 A1 | 9/2007 | Endo et al. | |

OTHER PUBLICATIONS

Kajita, S., "The 3D Linear Inverted Pendulum Mode: A simple modeling for a biped walking pattern generation," Proceedings of the 2001 IEEE/RSJ, International Conference on Intelligent Robots and Systems, Oct. 29th-Nov. 3, 2001, pp. 239-246.

Pratt, J., et al., "Capture point: A step toward humanoid push recovery," Proceedings of the IEEE-RAS International Conference on Humanoid Robots, pp. 200-207, Dec. 2-4, 2006.

Pratt, J., et al., "Velocity based stability margins for fast bipedal walking," In Fast Motions in Robotics and Biomechanics—Optimization and Feedback Control.M.Diehl, K.D.Mombaur (editors), Lecture Notes in Information Science, Springer, No. 340, Sep. 2006.

Rebula, J., et al., "Learning Capture Point for Improved Humanoid Push Recovery," Humanoids 07, Nov.-Dec. 2007, 8 pages.

PCT International Search Report and Written Opinion, PCT/US2008/083935, Jan. 28, 2009, 8 pages.

Abdallah, M. et al., "A Biomechanically Motivated Two-Phase Strategy for Biped Upright Balance Control," Proceedings of the 2005 IEEE International Conference on Robotics and Automation, Apr. 2005, pp. 2008-2013, Barcelona, Spain.

Kajita, S. et al., "The 3D Linear Inverted Pendulum Mode: A Simple Modeling for a Biped Walking Pattern Generation," Proceedings of the 2001 IEEE/RSJ International Conference on Intelligent Robots and Systems, Oct. 29-Nov. 3, 2011, pp. 239-246, Maui, Hawaii, USA.

Yamakita, M. et al., "Virtual Coupling Control for Dynamic Bipedal Walking," Proceedings of the IEEE International Conference on Intelligent Robots and Systems, 2001, pp. 233-238, vol. 1.

* cited by examiner

LEARNING CAPTURE POINTS FOR HUMANOID PUSH RECOVERY

CROSS-REFERENCE TO RELATED APPLICATION

This application claims priority from the following U.S. provisional patent application, which is hereby incorporated by reference: Ser. No. 60/989,706, filed on Nov. 21, 2007, entitled "Learning Capture Points for Humanoid Push Recovery."

BACKGROUND OF THE INVENTION

1. Field of the Invention

The present invention relates to controlling the stepping motion of a robot.

2. Description of Background Art

Appropriate foot placement is important when attempting to come to a stop during dynamic three dimensional bipedal walking. Simple models can be used to determine where to step in order to stop, but the errors resulting from the assumptions of these models may be significant, especially in bipeds with a large number of degrees of freedom, distributed mass, and complex walking control systems. More complex models can reduce the errors resulting from these assumptions, but even with accurate models, small errors in modeling parameters may lead to significant errors in predicting the desired stepping location.

Humans are very adept at stepping in just the right place after being pushed in order to regain balance. From simple observations of toddlers it is clear that this ability improves with practice and that learning likely plays a large role in a person's ability to choose an appropriate place to step. This ability becomes almost reflexive for humans. Since humans are generally adept at stepping to an appropriate place to recover from pushes, it is reasonable to expect that humanoid robots can more effectively operate in real world environments and perform tasks that humans perform if the robots are similarly adept at recovering from pushes.

SUMMARY OF THE INVENTION

Embodiments of the invention provide techniques for controlling a robot having at least two legs, the robot subjected to an event such as a push that requires the robot to take a step to prevent a fall. In one embodiment, a current capture point is determined, where the current capture point indicates a location on a ground surface that is the current best estimate of a stepping location for avoiding a fall and for reaching a stopped state. The robot is controlled to take a step toward the current capture point. After taking the step, if the robot fails to reach a stopped state without taking any additional steps, an updated current capture point is determined based on the state of the robot after taking the step. The current capture points can be stored in a capture point memory and initialized based on a model of the robot.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION OF THE EMBODIMENTS

Figure 1:
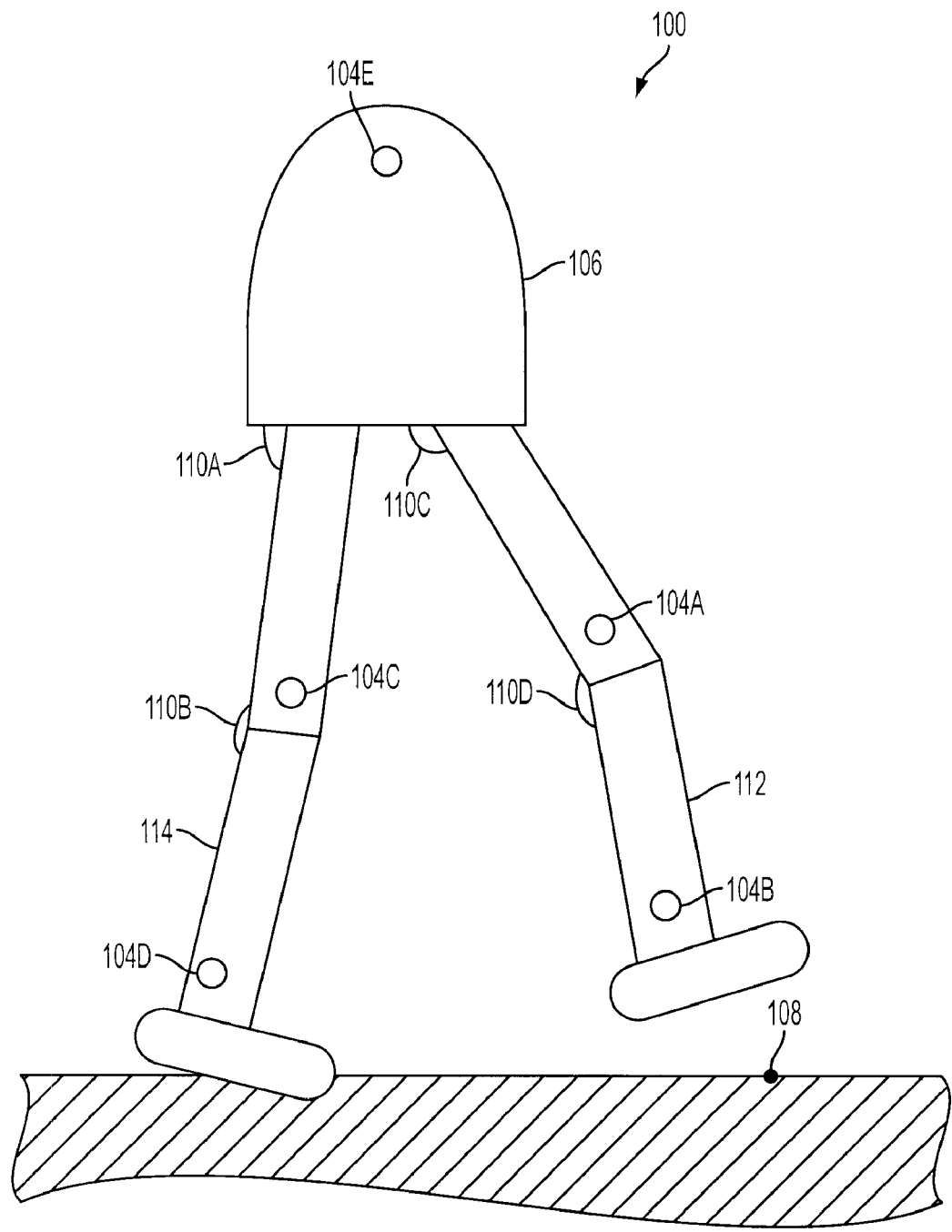
FIG. 1 illustrates a humanoid biped robot, in one embodiment.

A preferred embodiment of the present invention is now described with reference to the figures where like reference numbers indicate identical or functionally similar elements. Also in the figures, the left most digits of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

FIG. 1 illustrates a humanoid biped robot 100, in one embodiment. The robot includes a swing leg 112, a stance leg 114, and a body 106. The various components of the robot, including the legs and body, have mass and inertia. The illustrated robot is currently in motion and is about to take a step with the swing leg to location 108 on the surface. In one embodiment, location 108 is a capture point, described below. The robot includes various sensors 104A-104E for measuring position and/or velocity. The output from the sensors can be used to determine the current state of the robot. Biped robots other than the embodiment illustrated in FIG. 1 may be used, such as robots with more complex bodies. The robot includes actuators, or motors, for moving its legs in order to take a step. These actuators are controlled by a control system.

In one embodiment, the robot 100 is subjected to an event which requires the robot to take another step to prevent falling. Such events could be a push, such as a horizontal force applied to the body 106 of the robot, the result of sensor noise or control glitches, uneven ground moving below the robot, slipping on a slippery surface, or the robot being commanded to take a step. In fact, dynamic walking is often referred to as walking in which there are instances in which another step is necessary to prevent falling. This is certainly the case in human walking and is typical of high performance humanoid robots. The description below is applicable anytime the robot is in a state in which another step is required to prevent a fall. It is also applicable to robots with more than two legs, and states in which any number of legs are in contact with the ground. For illustrative purposes, the description below focuses on the configuration in FIG. 1 in which the robot is in single support phase and is in the process of taking a step to regain balance. In this configuration there is a single support leg 114, also referred to as a stance leg, and a single swing leg 112. Also, the "push" referred to in the description below can be any of the events mentioned above.

A capture point 108 is a point on the ground to which a biped robot 100 can step to and reach a stopped state without requiring another step. The locus of all possible capture points is the capture region. The location of the capture points are a function of the robot's current state, the control actions during the current stance phase (e.g., while the robot is taking a step), and the control actions during the next stance phase in which the robot attempts reach a stopped state (e.g., after the robot has taken a step). Accurate determination of a capture point can improve the robot's ability to recover from a push by taking a step. The control system of the robot can learn the capture points for various states by using learning methods described below.

A stopped state can be defined as a state in which the robot's Center of Mass velocity, angular momentum about the Center of Mass, and Center of Mass linear and rotational acceleration are all less than given thresholds. The velocity and acceleration thresholds need to be non-zero for stopped states to exist for many bipedal models. For example, for a point-foot, point-mass biped, zero Center of Mass velocity and acceleration cannot be achieved during single support in the presence of infinitesimal disturbances. "Single support" refers to support by only one leg. With small but finite thresholds, the robot 100 will be essentially stopped, such that with a small amount of Center of Pressure regulation on the foot or a small amount of upper body motions, the robot could maintain balance without requiring any additional steps. For humanoid robots with non-point feet, given reasonable velocity and acceleration thresholds, being in a stopped state will also imply that the capture region has a large intersection with the convex hull of the support feet.

The robot 100 can be considered to have two main phases: the capture step and the stopping stance phase. The capture step, in one embodiment, is a single support phase of swing leg 112 placement during which the robot takes a step in an attempt to reach a stopped state during the next support phase. FIG. 1 illustrates a robot in the capture step. During the stopping stance phase, occurring after the capture step, the robot attempts to reach a stopped state without taking any additional steps. The stopping stance phase can be a double support phase, a double support phase followed by a single support phase, or an instantaneous exchange of support into a single support phase.

Figure 2:
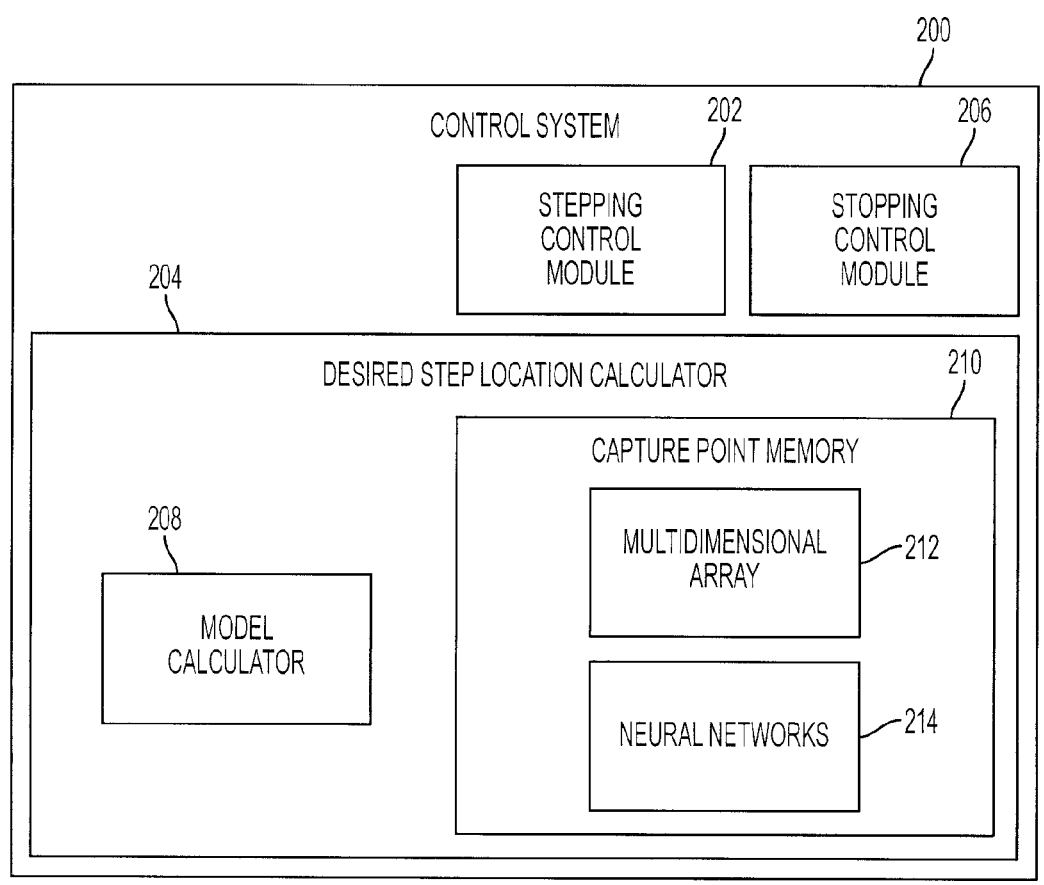
FIG. 2 illustrates the control system of the robot, in one embodiment.

FIG. 2 illustrates the control system 200 of the robot 100, in one embodiment. The modules illustrated in FIG. 2 may be implemented in hardware and/or software and may be located in the robot or in a remote location. As mentioned above, when the robot is pushed, it loses its balance and takes a capture step to reach a stopped state. The stepping control module 202 is the control module the robot uses during the capture step. The stepping control module communicates with a desired step location calculator 204 that calculates a desired step location for the robot to step to during the capture step. The desired step location is an estimation of a capture point on the ground that will enable the robot to reach a stopped state during the stopping stance phase. The robot then uses the stopping control module 206 during the stopping stance phase to come to a stopped state.

The stepping control module 202 is a function of the robot's state, some internal controller state variables, and a desired stepping location. The stepping control module does a reasonable job of stepping to the desired step location during the capture step, maintaining balance, and regulating any other important aspects of walking. The stepping control module attempts to step toward the desired step location, but may not actually end up stepping to the desired step location. The outputs of the stepping control module include, for example, commands to various actuators in the robot 100 to move the swing leg 112 of the robot in a desired trajectory. The stepping control module may query the desired step location calculator 204 either at predefined trigger events, or continuously throughout the swing to determine where to step to. The stopping control module 206 is a function of the robot's state and perhaps some internal controller state variables. The stopping control system does a reasonable job of reaching a stopped state, without requiring an additional step, from a reasonably sized basin of attraction of states.

In one embodiment, the stepping control module 202 and stopping control module 206 are designed using simple physics-based heuristic control rules. The main strategy used for the stopping control module 206 is to modulate the Center of Pressure on the support foot based on the Linear Inverted Pendulum model, further described below, in order to have the Center of Mass come to rest over the foot. The control modules can also use strategies that involve accelerating internal momentum or altering the Center of Mass trajectory based on velocity.

The desired step location calculator 204 can calculate a desired step location, referred to here as a current capture point, based on its internal state variables, the internal state variables of the stepping control module 202, and the state of the robot 100. The desired step location calculator can be provided access to the internal state variables of the stepping control module. In one embodiment, a new desired step location calculator can be created for a biped robot with a preexisting stepping control module and a preexisting stopping control module 206. The desired step location calculator uses learning methods as described below to provide improved current capture points over time to the stepping control module.

Choosing an appropriate stepping location is an important control action to take when attempting to stop in bipedal walking, particularly in 3-D bipedal walking. Other control actions, such as moving the Center of Pressure on the feet, accelerating internal momentum (e.g., lunging the upper body or "windmilling" the arms), or altering the Center of Mass trajectory are also useful control actions. However, their success in push recovery usually depends on the control system 200 first choosing an appropriate step location, such that these control actions can be used to bring the robot 100 to a stopped state. As a result, it can be important for the stepping control module 202 to receive accurate current capture points from the desired step location calculator 204.

The model calculator 208 determines a capture point based on a model of the robot 100. A model is a simplified representation of the robot that allows for a direct and rapid calculation of a capture point. However, since the model is only an approximation of the robot, the capture point calculated from the model may not be an actual capture point of the robot. The model calculator calculates capture points by creating a set of model parameters from the input robot state, and applying predetermined model calculations to the model parameters to determine capture points. Methods for determining the robot state from position and velocity sensors 104 on the robot are described below. Capture points calculated by the model calculator are referred to here as model capture points. Model capture points are used by the desired step location calculator 204 to determine current capture points for the robot, as described below.

A variety of robot models can be used for the model calculator 208. The model can be chosen based on the ease of calculating model parameters from the robot state, the ease of calculating model capture points from the model parameters, or the accuracy of the model compared to the actual robot 100. A more accurate model will likely result in model capture points that are closer to the actual capture points, resulting in more rapid learning of capture points by the desired step location calculator 204. In one embodiment, a Linear Inverted Pendulum model of the robot, a model known in the art, is used by the model calculator. The parameters of the Linear Inverted Pendulum model include the position and motion of a point mass representing the body of the robot, for example. The Linear Inverted Pendulum model is useful because it is often a fairly accurate representation of a biped robot. The Linear Inverted Pendulum model also allows for rapid calculation of model capture points. Other suitable robot models can also be used.

The desired step location calculator 204 includes a capture point memory 210. The capture point memory contains data that can be used to determine a current capture point based on a robot state. In one embodiment, the robot state is converted to a set of state parameters that are used to retrieve a current capture point from the capture point memory. The data can be represented as a multidimensional array 212 or neural networks 214. Other representations are possible. The capture point memory is updated based on whether the robot 100 was able to successfully reach a stopped state using a current capture point. As a result, the current capture points determined from the capture point memory become more accurate as the robot undergoes more stepping trials. The data of the capture point memory can be stored in a RAM that is accessible to the desired step location calculator. The capture point memory 210 can store current capture points or offsets to a model capture point representing a current capture point. In the description below, it is assumed that the capture point memory 210 holds current capture points.

In one embodiment, each dimension of the multidimensional array 212 can correspond to a state parameter, the state parameters representing the state of the robot 100. State parameters may include joint angles and joint velocities of the robot, or various other parameters that specify the robot state. For example, in the robot illustrated in FIG. 1, the robot state can include the positions and velocities of the robot body 106 and the segments of each of the legs 112 and 114. The robot state can also be defined by the joint angles 110A-D and joint angle velocities. The sensors 104A-E measure the position and/or velocity at various points on the robot. The data from the sensors 104 can be used to determine the parameters of the robot state. For example, position data from sensors 104C and 104D can be used to determine joint angle 110B. Given known information about the mass distribution of the various components of the robot, the Center of Mass of the robot can be determined for a particular robot state. Other methods of measuring the robot state can also be used in addition to or instead of sensors 104.

The state parameters can be discretized to determine index values in the multidimensional array 212. For example, suppose that there are three state parameters corresponding to three joint angles 110, each with values ranging from 0 to 359 degrees. The joint angle values can be converted to index values by dividing the joint angle values by 10 and taking the integer floors of the results. In this case, three angles of 27 degrees, 122 degrees, and 83 degrees would result in index values of 2, 12, and 8 into the multidimensional array. Such a multidimensional array would need to allow for 36×36×36 locations to support all possible state parameters.

The value stored at each location of the multidimensional array 212 is the current capture point for the robot 100 in a state defined by the state parameters corresponding to the index values of the location. This current capture point can be represented as a pair of numbers (x,y) that are the relative horizontal and vertical distances from the location of the support foot (of the stance leg 114) to the current capture point. For example, a pair of numbers (15,−12) stored in the multidimensional array may indicate that, for the given states corresponding to the index values, the swing leg should attempt to step to a point 15 centimeters in a positive horizontal direction and 12 centimeters in a negative vertical direction from the support foot, where positive and negative directions are predefined relative to the support foot.

If the multidimensional array size is too large, greater ranges of parameter values can be "binned" together into a single index value. In the example above, the joint angles can be divided by 20 degrees instead of 10 degrees. This would result in a smaller number of possible index values and smaller required multidimensional array size. A possible disadvantage is that a greater range of state parameter values would be represented by the same index value, making the values of the multidimensional array 212 correspond less accurately to the state parameter values.

The robot state may require several parameters for a complete description, depending on the number of degrees of freedom of the motion of the robot. For example, the robot illustrated in FIG. 1 may have four degrees of freedom, and the state parameters can be defined as the four joint angles 110A-D and angular velocities. However, an actual robot may have twenty degrees of freedom or more, requiring a very large multidimensional array 212 to cover a wide range of possible robot states, even if the state parameters are discretized at a coarse granularity. One way to reduce the required memory space for the multidimensional array 212 is to use fewer state parameters to describe the robot state. These reduced state parameters can be determined by various methods. For example, state parameters corresponding to the joint angles that cause significant differences in the robot state (e.g., the knee joints) can be used while other joint angles (e.g., the finger joints) can be ignored. Also, various measurements of the robot can be combined to reduce the number of state parameters.

In one embodiment, the robot state can be compactly represented using three state parameters that effectively differentiate among various robot states. The first two state parameters are the x and y coordinates of the model capture point for the current robot state. The model capture point is determined by calculating the model parameters from the current robot state and using the model calculator 208 to calculate the model capture point. In one embodiment, the model used by the model calculator is the Linear Inverted Pendulum model. The third parameter is the current horizontal distance from the foot of the stance leg 114 to the Center of Mass of the robot 100. These three state parameters are referred to here as the compact state representation of the robot.

The data in the capture point memory 210 can also be stored in a set of radial basis function neural networks 214, also referred to as the Networks. The Networks are used as functional approximators that do not require the use of discrete memory locations for current capture points corresponding to various robot states. The current capture points can be stored in a set of a predetermined number of Networks. The particular Network used to store a current capture point is based on the horizontal distance from the foot of the stance leg 114 to the Center of Mass of the robot in a given state. This is the third parameter of the compact state representation of the robot.

Each Network has a two-dimensional input vector composed of the first two parameters of the compact state representation of the robot, in one embodiment. These parameters are the x and y coordinates of the model capture point for a robot state. Each Network has a predetermined number of Gaussian basis functions with centers on a grid with a predetermined spacing along each input dimension. Each Gaussian basis function is defined by:

$$G(\vec{x}) = A e^{\left(-\frac{(\vec{x}-\vec{x}_0)^2}{r^2}\right)} \quad (1)$$

where $\vec{x}$ is the input velocity vector, $\vec{x}_0$ is the center of the Gaussian basis function, r is the predetermined spacing, and A is the weight attributed to the Gaussian basis function. A is updated to train the Network and enable more accurate current capture points to be retrieved from the Network.

To query the Networks for a capture point corresponding to a given robot state, the desired step location calculator 204 selects the Network to use based on the current horizontal distance from the foot of the stance leg 114 to the Center of Mass of the robot. For example, if the predetermined spacing of the Networks is 3 centimeters, then this distance falls within a particular 3 centimeter range corresponding to a particular Network. The desired step location calculator then uses the (x,y) coordinates of the model capture point as the input vector to the particular Network to retrieve the associated current capture point. The current capture point, $x_{capture}$, is given by:

$$x_{capture} = \sum_{G \in G} G(\vec{x}) \quad (2)$$

where G is the set of basis functions in the Network. $x_{capture}$ is a vector containing the x and y coordinates of the current capture point. In the description above, the compact state representation of the robot is used for choosing a Network and determining an input vector to the Network. However, other state representations of the robot can also be used, including representations that do not depend on a model. This may result in slower learning.

Figure 3:
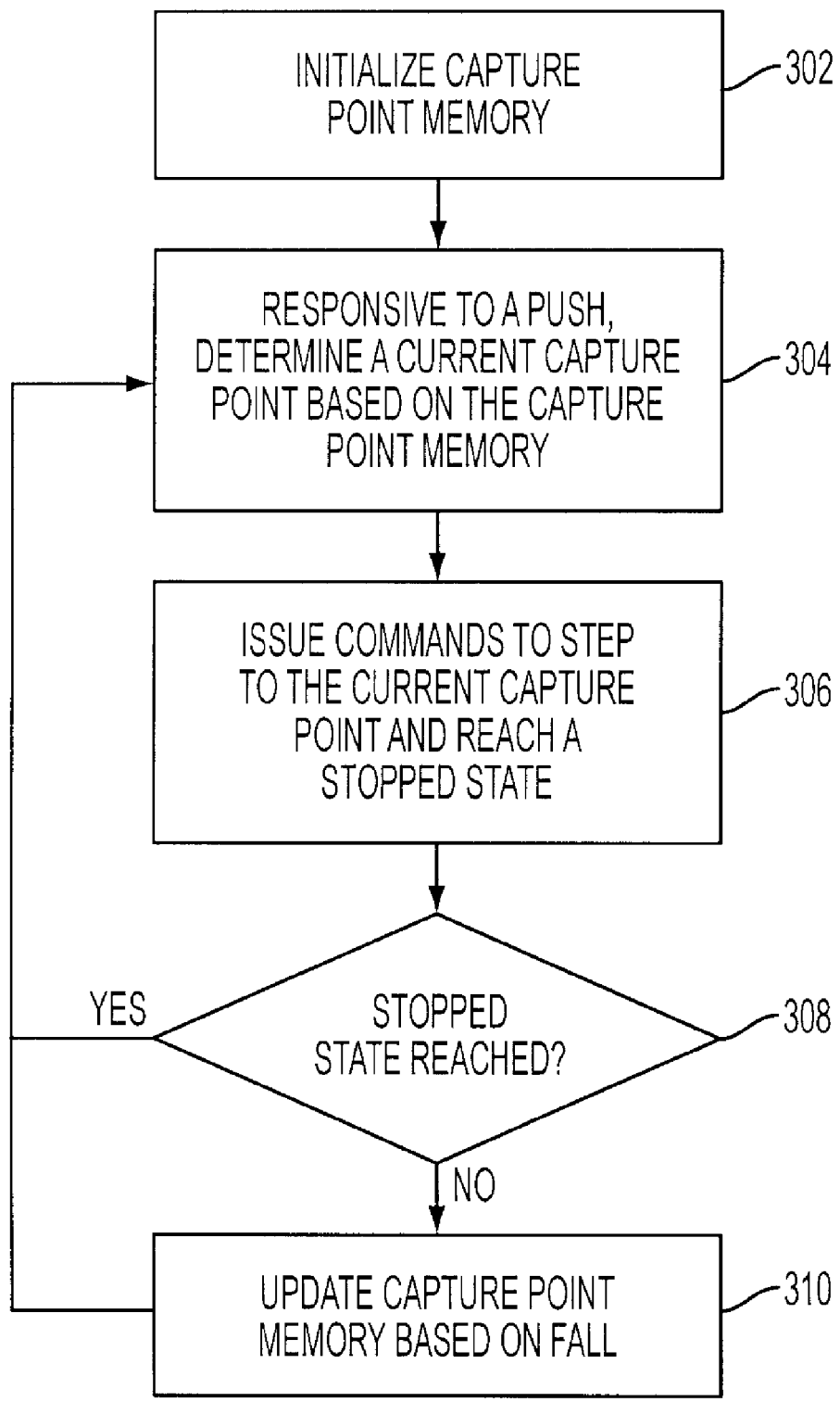
FIG. 3 is a flowchart illustrating a method for learning the capture points of a biped robot, in one embodiment.

FIG. 3 is a flowchart illustrating a method for learning the capture points of a biped robot 100, in one embodiment. The capture point memory 210 is initialized 302 so that the desired step location calculator 204 can provide initial current capture points in the initial phases of learning. In one embodiment, the memory is initialized with model capture points using a model such as the Linear Inverted Pendulum model that approximately describes the robot. The locations in the multidimensional array 212 can be initialized with model capture points for robot states corresponding to the indexes of the locations. The Networks can similarly be initialized so that they return the model capture point, within an acceptable error bounds, for a given input vector. The multidimensional array 212 or the Networks can also be initialized to zero. However, this may result in slower learning.

The robot 100 then undergoes a push trial by being subjected to a push. The robot may be pushed as part of its normal tasks, or may be pushed deliberately to cause capture points to be learned. The stepping control module 202 of the robot queries the desired step location calculator 204 for a current capture point given the robot state after the push. The desired step location calculator determines 304 a current capture point based on the capture point memory 210 and provides the current capture point to the stepping control module. The stepping control module then issues 306 commands to the robot to step to the current capture point and the stopping control module attempts to reach a stopped state. The control system 200 then determines 308 whether a stopped state was reached. This determination can be based on values from sensors 104 that indicate the robot has achieved a balanced state with its velocity remaining below a given threshold. Generally, if the robot does not reach a stopped state, it will soon fall to the ground (unless it takes another step).

If the robot 100 reached a stopped state, then the robot undergoes another push trial with a different push (e.g., a different force or direction) to continue the learning process. In this case, no update to the capture point memory 210 is needed because the current capture point resulted in the robot successfully reaching the stopped state. In other words, the current capture point is already an actual capture point for the robot. If the robot failed to reach a stopped state, then the capture point memory is updated 310 so that it will provide a more accurate current capture point for a similar robot state in the future. The current capture point can be updated based on how the robot failed to reach a stopped state (e.g., direction and magnitude of fall). The robot then undergoes another push trial. The next push can be the same as the previous push in order to retest the same robot state and further refine the current capture point for that state. The next push can also be a different push. As more push trials are performed, the capture point memory is updated and more accurate current capture points are produced, resulting in the desired step location calculator learning capture points for the robot.

Figure 4:
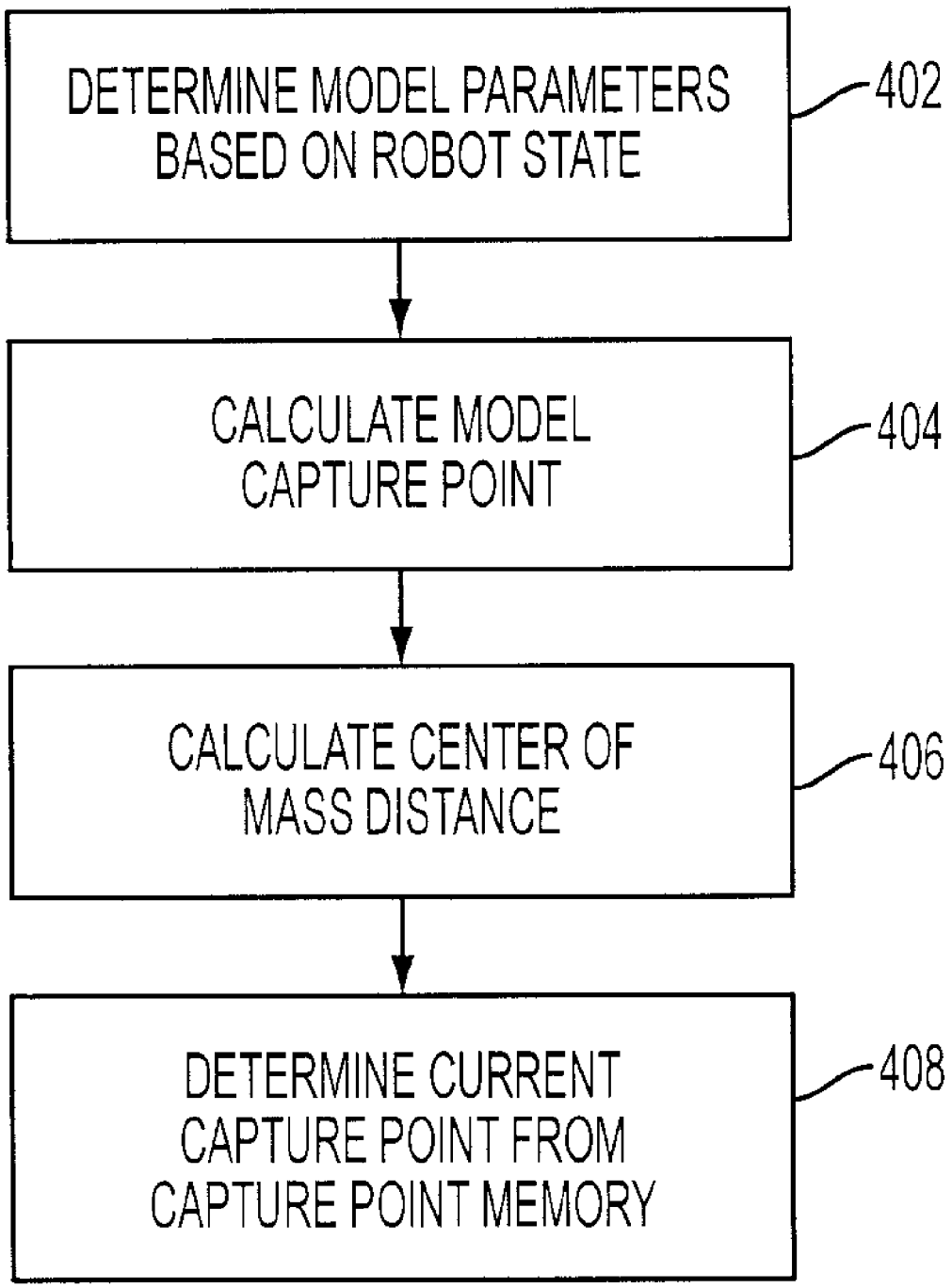
FIG. 4 is a flowchart illustrating a method for determining a current capture point responsive to a push, in one embodiment.

FIG. 4 is a flowchart illustrating a method for determining 304 a current capture point responsive to a push, in one embodiment. The desired step location calculator 204 determines 402 model parameters based on the robot state, as described above. Model parameters for a Linear Inverted Pendulum model may include, for example, a mass of a point representing the body, and a velocity and position of the point mass. Certain model parameters, such as the mass may remain constant for a given robot. Other model parameters can be dynamically determined from position and velocity sensors 104 on the robot, such as the current point mass velocity.

The model calculator 208 calculates 404 the model capture point based on the model parameters. The resulting model capture point includes x and y coordinate values. The horizontal distance from the foot of the stance leg 114 to the Center of Mass of the robot is calculated 406 based on the current robot state. A compact state representation of the robot can be created from the x and y coordinate values of the model capture point and the calculated horizontal distance. The desired step location calculator 204 then determines 408 the current capture point from the capture memory given the compact state representation. The desired step location calculator can use the methods described above for retrieving a current capture point from the multidimensional array 212 or neural networks 214.

Figure 5:
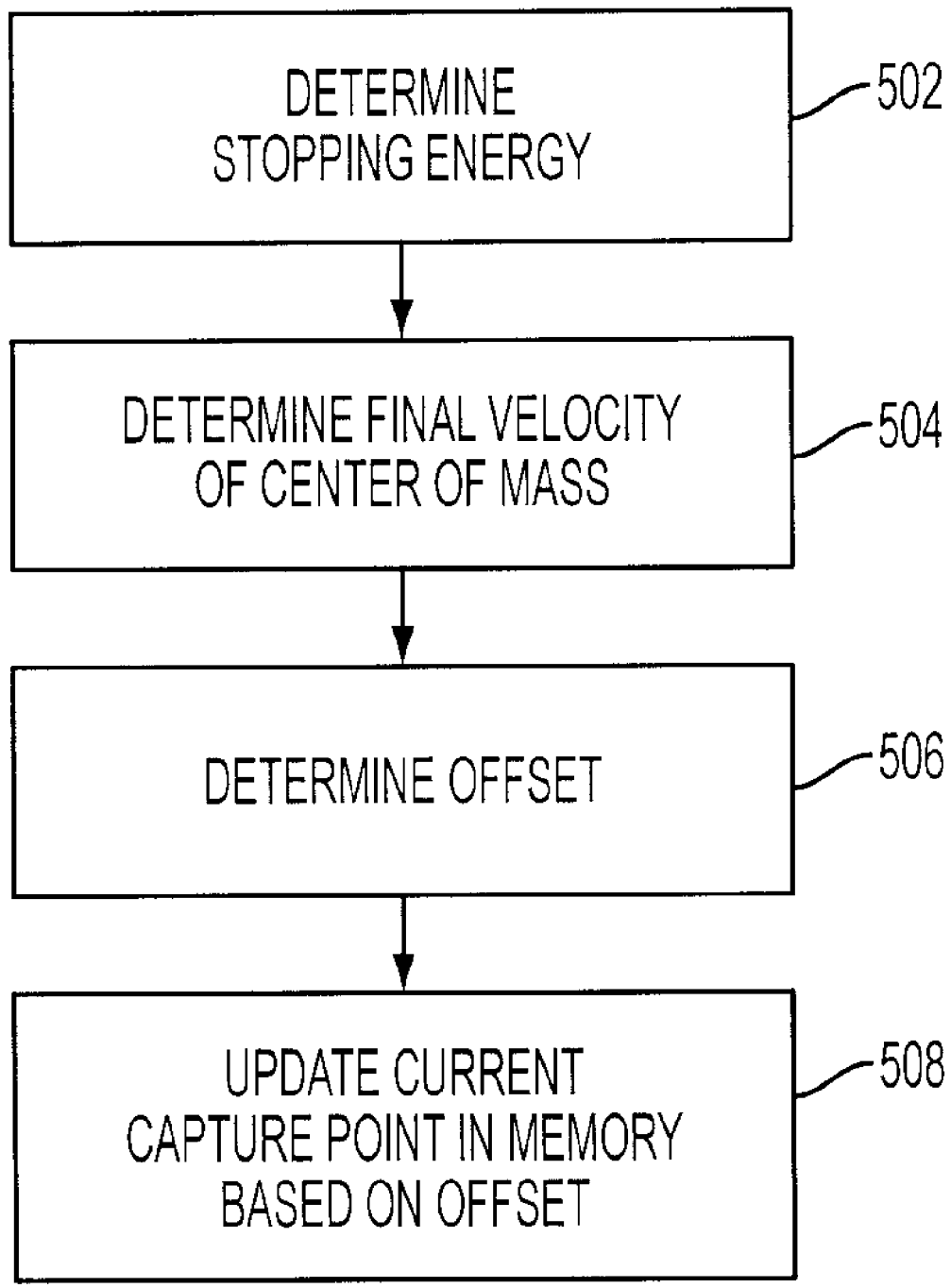
FIG. 5 is a flowchart illustrating a method for updating a capture point memory, in one embodiment.

FIG. 5 is a flowchart illustrating a method for updating 310 a capture point memory, in one embodiment. This process occurs when the robot 100 fails to reach a stopped state after stepping to a current capture point. Initially, the desired step location calculator 204 determines 502 the Residual Stopping "Energy", $E_{stopping}$, of the robot:

$$E_{stopping} = \frac{1}{2}|\dot{\vec{x}}|^2 + \frac{1}{2}\frac{g}{l}|\vec{x}|^2 \qquad (3)$$

$\vec{x}$ represents the ground projection of the vector from the support foot to the Center of Mass of the robot. $\dot{\vec{x}}$ represents the velocity of the ground projection of the vector from the support foot to the Center of Mass of the robot. In this case, the support foot is the foot of the swing leg 112 after the swing leg has made contact with the ground and the robot is attempting to reach a stopped state. g represents the gravitational acceleration, and l represents the average height of the Center of Mass of the robot. $E_{stopping}$, also referred to as the stopping energy, is similar to the conserved Orbital Energy of the Linear Inverted Pendulum model, except that the two terms are added instead of subtracted.

$E_{stopping}$ decreases as the Center of Mass approaches the support foot and decelerates. It reaches a minimum approximately when the Center of Mass is closest to the foot. The minimum value of $E_{stopping}$ that is achieved during an attempted stop is referred to as the Stopping Error, and the state of the robot at that instance is referred to as the "Top of Stance" state. For a given push, it is reasonable to expect that the Stopping Error will decrease as the robot steps closer to the actual capture region. As a result, the magnitude of the Stopping Error can be used to update the current capture point stored in the capture point memory 210 to be closer to an actual capture point. When the robot steps to an actual capture point, the Stopping Error will be near zero since the robot will pass through a Stopped State, with the Center of Mass approaching a balanced position over the support foot.

In one embodiment, $E_{stopping}$ is continuously calculated from the time the robot takes a step with the swing leg 112 until the time the robot 100 falls below a certain threshold, such as a certain percentage of its maximum height. The threshold can be chosen so that, once the robot falls below the threshold, it is clear that the robot will continue falling in its current trajectory without intervention. The minimum $E_{stopping}$ is then chosen from the calculated values as the Stopping Error. More optimized methods of calculating the Stopping Error are possible, such as observing the derivative of the calculated $E_{stopping}$ values to determine when the minimum value has been found.

The desired step location calculator then determines 506 an offset to apply to the current capture point in the capture point memory 210 to update the current capture point. The offset, $\vec{\delta}_{offset}$, can be calculated as:

$$\vec{\delta}_{offset} = E_{stopping}\dot{x}_{final} \qquad (4)$$

where $E_{stopping}$ is Stopping Error and $\dot{x}_{final}$ refers to the final velocity of the Center of Mass as the robot 100 falls below the predetermined threshold. The components of $\dot{x}_{final}$ are normalized so that the vector has a magnitude of 1. The direction of $\vec{\delta}_{offset}$ corresponds to the direction of $\dot{x}_{final}$. For example, if the robot stepped to the right and also fell to the right, then the robot did not step far enough to the right. The current capture point should be adjusted to be further to the right. Similarly, if the robot stepped to the right and fell to the left, then the robot stepped too far to the right. In this case, the current capture point should be adjusted to be further to the left.

The desired step location calculator then updates 508 the current capture point in memory 210 based on the calculated offset. In one embodiment, $\vec{\delta}_{offset}$ can be multiplied by a constant, $K_{learning}$, before being applied to the stored capture point to maintain the stability of the learning process:

$$\Delta V = \delta_{offset} K_{learning} \quad (5)$$

One possible value of $K_{learning}$ is 0.6. If the current capture points are stored in a multidimensional array 212, the appropriate current capture point can be updated by adding the scaled offset vector, $\Delta V$, to the stored current capture point.

If the current capture points are stored in Networks 214, the x and y values of $\Delta V$ are used to update the weights of each radial basis function. This is done by calculating the total unweighted response, $V_{unweighted}$, of the set of basis functions G in the appropriate Network by setting all the function weights to 1:

$$V_{unweighted} = \sum_{G \in G} G(\vec{x})|_{A=1} \quad (6)$$

The appropriate Network is determined as discussed above. Each weight, $A_i$, in the Network is changed by calculating its unweighted contribution to the Network and multiplying by the desired $\Delta V$:

$$\Delta A_i = \Delta V \frac{G_i|_{A=1}}{V_{unweighted}} \quad (7)$$

As an example, suppose that the robot 100 has a total mass of 28.84 kilograms (kg), a mass in the body of 16.0 kg, a mass in each leg of 6.42 kg, a leg length of 0.911 meters (m), a standing Center of Mass height of 0.945 m, a foot width of 0.1 m, and a foot length of 0.203 m. Further suppose that the robot is subjected to 2000 random pushes to train the Networks with force magnitudes ranging from 200 to 450 Newtons. In this example situation, one possible embodiment of the radial basis function networks and updating rule is as follows. There can be 11 Networks, with each Network having 4356 Gaussian basis functions with centers on a grid with 3 centimeter (cm) spacing along each input dimension (i.e., r is 0.03 m). The height threshold for stopping a trial can be 0.85 m, and $K_{learning}$ can be 0.6.

The process described above for learning capture points of a robot makes use of model capture points calculated from a model of the robot. The process does not attempt to improve the model or recalculate better parameters for the model, but rather attempts to adjust the output of the model. Although the Linear Inverted Pendulum model has been described above, a wide range of models can be used. The use of more accurate models may result in faster learning of accurate capture points.

The description above includes a method to learn capture points, points on the ground in which the robot can step to in order to stop in a single step. However, it is often the intention that the robot should take multiple steps and not necessarily stop after each one. The embodiments described above can also be applied in this case, since if one knows the location of capture points, then the capture points can be used as a basis for desired stepping locations when it isn't necessary to come to a complete stop. For instance, if it is desired for the robot to step to the left two steps in the future, the robot can step to the right of the current capture point, such that the robot will start falling to the left, requiring a step to the left as desired to come to a stop. The capture points can therefore be used as a basis for such things as determining multiple steps across a room (e.g., the "stepping stones problem"). Also, if the robot is commanded to step to a capture point, the robot does not necessarily need to come to a complete stop after the step. While the robot has the option to come to a stop, through appropriate control it can continue walking at a fast, dynamic pace.

Although the invention has been described in considerable detail with reference to certain embodiments thereof, other embodiments are possible as will be understood to those skilled in the art.

What is claimed is:

1. A method for controlling a robot having at least two legs, the robot subjected to an event that initiates a fall of the robot, the method comprising:
    determining a first state of the robot following the event that initiates the fall;
    determining, by at least one processor, a current capture point based on the first state of the robot following the event that initiates the fall, the current capture point indicating a location on a ground surface;
    controlling the robot to take a capture step toward the current capture point; and
    responsive to the robot failing to reach a stopped state and continuing the fall after taking the capture step, determining a second state of the robot during the fall and determining an updated current capture point based on the second state of the robot during the fall after taking the capture step.

2. The method of claim 1, wherein the current capture point is determined based on data retrieved from a capture point memory and wherein the method further comprises:
    updating the capture point memory based on the updated current capture point.

3. The method of claim 2, wherein the capture point memory comprises a multidimensional array storing current capture point data.

4. The method of claim 2, wherein the capture point memory comprises a neural network storing current capture point data.

5. The method of claim 2, further comprising:
    determining the first and second states of the robot based on sensors at a plurality of positions on the robot, the sensors for measuring position or velocity.

6. The method of claim 2, further comprising:
    determining a representation of the first and second states of the robot based on a model of the robot, the representation for retrieving data from the capture point memory.

7. The method of claim 1, wherein the current capture point is initialized based on a model of the robot.

8. The method of claim 1, wherein the updated capture point is determined based on a residual stopping energy associated with the capture step.

9. The method of claim 8, wherein the residual stopping energy is determined based on a position and a velocity of a support foot relative to a center of mass of the robot after the robot has taken the capture step.

10. The method of claim 1, wherein a stopped state comprises a state in which the robot has not fallen and in which a center of mass velocity of the robot, an angular momentum about a center of mass of the robot, and a center of mass acceleration of the robot are all less than given thresholds.

11. A system for controlling a robot having at least two legs, the robot subjected to an event that requires the robot to take a step to prevent a fall, the system comprising:
    a computer-readable storage medium storing executable computer program modules configured for:
        determining a first state of the robot following the event that initiates the fall;

determining a current capture point based on the first state of the robot following the event that initiate the fall, the current capture point indicating a location on a ground surface;

controlling the robot to take a capture step toward the current capture point; and responsive to the robot failing to reach a stopped state and continuing the fall after taking the capture step, determining a second state of the robot during the fall and determining an updated current capture point based on the second state of the robot after taking the capture step.

12. The system of claim 11, wherein the current capture point is determined based on data retrieved from a capture point memory and wherein the modules are further configured for:

updating the capture point memory based on the updated current capture point.

13. The system of claim 12, wherein the capture point memory comprises a multidimensional array storing current capture point data.

14. The system of claim 12, wherein the capture point memory comprises a neural network storing current capture point data.

15. The system of claim 12, wherein the modules are further configured for:

determining the first and second states of the robot based on sensors at a plurality of positions on the robot, the sensors for measuring position or velocity.

16. The system of claim 12, wherein the modules are further configured for:

determining a representation of the first and second states of the robot based on a model of the robot, the representation for retrieving data from the capture point memory.

17. The system of claim 11, wherein the current capture point is initialized based on a model of the robot.

18. The system of claim 11, wherein the updated capture point is determined based on a residual stopping energy associated with the capture step.

19. The system of claim 18, wherein the residual stopping energy is determined based on a position and a velocity of a support foot relative to a center of mass of the robot after the robot has taken the capture step.

20. The system of claim 11, wherein a stopped state comprises a state in which the robot has not fallen and in which a center of mass velocity of the robot, an angular momentum about a center of mass of the robot, and a center of mass acceleration of the robot are all less than given thresholds.

* * * * *